(12) United States Patent
Li

(10) Patent No.: US 7,464,909 B2
(45) Date of Patent: Dec. 16, 2008

(54) SUPPORTING SHELF

(76) Inventor: Chin-Chu Li, P.O. Box 26-757, Taipei 106 (TW)

( * ) Notice: Subject to any disclaimer, the term of this patent is extended or adjusted under 35 U.S.C. 154(b) by 204 days.

(21) Appl. No.: 11/648,592

(22) Filed: Jan. 3, 2007

(65) Prior Publication Data

US 2007/0108355 A1    May 17, 2007

Related U.S. Application Data

(63) Continuation-in-part of application No. 10/986,537, filed on Nov. 12, 2004, now abandoned.

(51) Int. Cl.
*E04G 3/00* (2006.01)
(52) U.S. Cl. .............. 248/280.11; 248/279.1; 248/274.1; 248/276.1
(58) Field of Classification Search ............ 248/280.11, 248/280, 276.1, 282.1, 284.1, 279.1, 122.1, 248/123.11, 123.2, 124.1, 125.8, 917, 919, 248/922, 923, 292.11, 297.11, 292.14, 576
See application file for complete search history.

(56) References Cited

U.S. PATENT DOCUMENTS

| | | | | | |
|---|---|---|---|---|---|
| 4,266,747 | A | * | 5/1981 | Souder et al. .......... | 248/280.11 |
| 4,852,842 | A | * | 8/1989 | O'Neill .................... | 248/284.1 |
| 5,180,136 | A | * | 1/1993 | Sova ........................ | 248/576 |
| 5,799,917 | A | * | 9/1998 | Li ............................ | 248/284.1 |
| 5,975,472 | A | * | 11/1999 | Hung ...................... | 248/278.1 |
| 5,992,809 | A | * | 11/1999 | Sweere et al. ........... | 248/278.1 |
| 6,896,230 | B2 | * | 5/2005 | Cvek ....................... | 248/276.1 |

* cited by examiner

*Primary Examiner*—J. Allen Shriver
*Assistant Examiner*—Toód M. Epps
(74) *Attorney, Agent, or Firm*—Rosenberg, Klein & Lee

(57) ABSTRACT

A supporting shelf includes a bearing seat, a first supporting arm, a second supporting arm, a third supporting arm and a setting seat. The bearing seat is pivotally connected with an end of the first supporting arm allowing the supporting shelf to swing left or right. An end of the second supporting arm is connected with another end of the first supporting arm through a pin-connected mechanism. An end of the third supporting arm is connected with another end of the second supporting arm. The setting seat is pivotally connected with a joint. The joint is pivotally connected with another end of the third supporting arm. The setting seat is for fixing a LCD moving up, down, left or right through the joint, whereby the length of the supporting shelf is increased, and the action area of the LCD is extended and is improved agility.

6 Claims, 11 Drawing Sheets

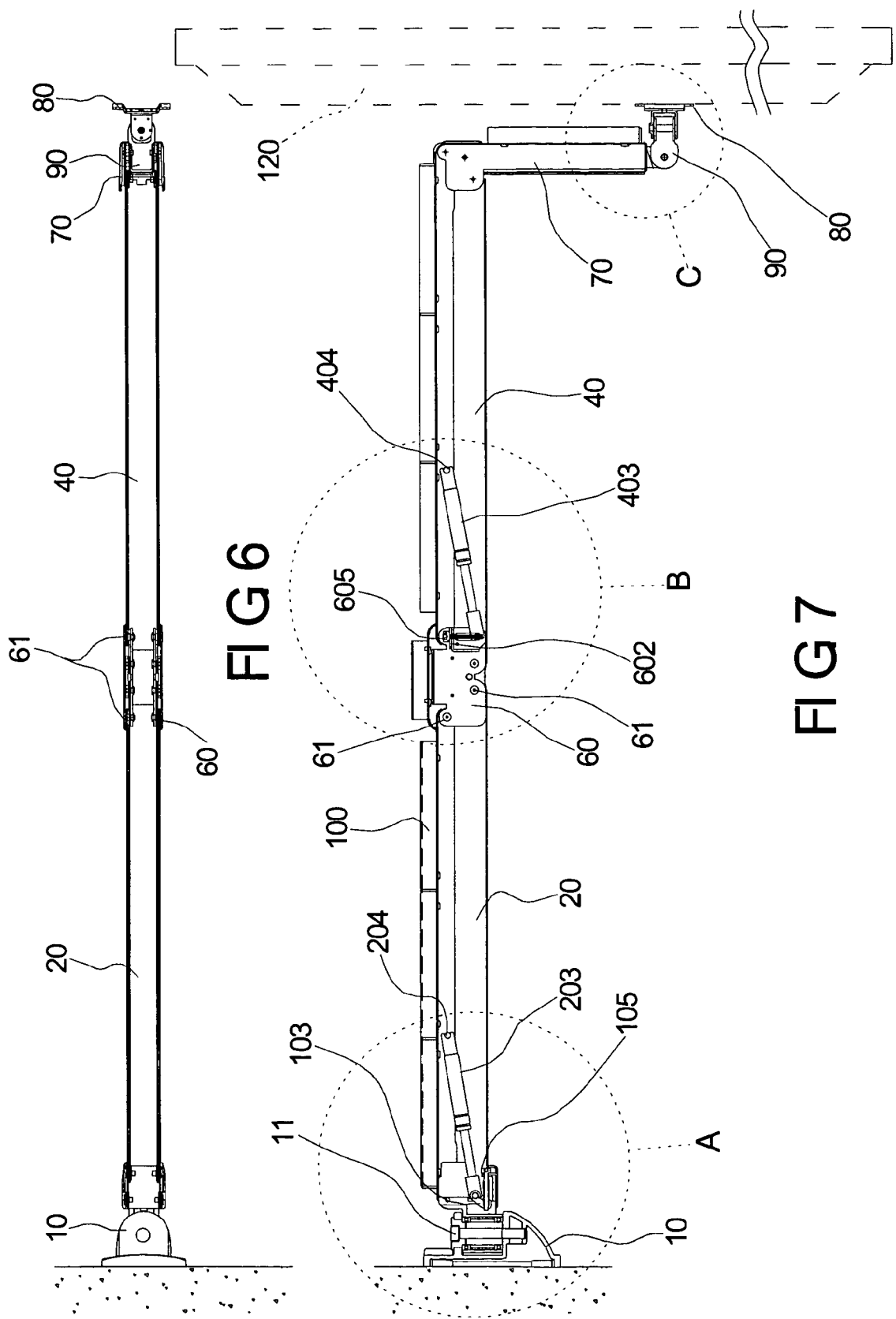

SUPPORTING SHELF

CROSS REFERENCE TO RELATED APPLICATION

This application is a continuation-in-part of U.S. application Ser. No. 10/986,537, filed on 12 Nov. 2004 now abandoned and entitled "a supporting shelf".

BACKGROUND OF THE INVENTION

1. Field of the Invention

The present invention relates to a supporting shelf and, more particularly, to a supporting shelf that is composed of a plurality of supporting arms, each of which is pivotally connected with each other. These supporting arms are extendable so that they can be adjusted to meet the user's needs.

2. Description of the Related Art

A common LCD screen with a supporting seat is usually set upon a table. Its user can adjust the viewing angle of the LCD for a more comfortable view. However, the design of the LCD is based upon it sitting upon a table, thus reducing the choices of viewing angles. In response to this problem, a supporting shelf was invented with a supporting arm attached to the LCD that allows the screen to be rotated. Thus such an LCD is not restricted by the supporting seat and can rotate freely.

The above-mentioned supporting shelf overcomes the restrictions in the action area of the single rotating supporting arm due to the arm's length.

For extending the action area of the LCD and increasing its agility, we the length of the supporting shelf must be increased whilst still allowing the supporting shelf to swing left or right and extend forwards or backwards to meet the user's needs.

SUMMARY OF THE INVENTION

It is therefore a principal objective of the present invention to provide a supporting shelf having an end attached to a LCD, which is composed of a plurality of supporting arms, and each of these supporting arms is pivotally connected with each other. These supporting arms are extendable between each other for extending the length of the supporting shelf to meet the user's needs.

To further achieve the above objective, one feature of the present invention is to provide for a supporting shelf, comprising: a bearing seat having a fixing part, a first connecting part pivotally connected with said fixing part and defining two first slideways at two opposing walls thereof, a first pin-connected part having an first axle at opposing ends thereof, each of said first axles fitting within said first slideways; and a first fixing screw rod screwed on said first connecting part and screwed through said first pin-connected part; a pin-connected mechanism, including a bracket having a front part and a rear part, a second connecting part connected with said front part and defining two second slideways at two opposing walls thereof, a second pin-connected part having an second axle at opposing ends thereof, each of said second axles fitting within said second slideways and a second fixing screw rod screwed on said second connecting part and screwed through said second pin-connected part; a first supporting arm having an end pivotally connected with said first connecting part and the other end pivotally connected with said rear part of said bracket, said first supporting arm including a first gas spring positioned in an inner portion of said first supporting arm and a first cross rod disposed at said inner portion of said first supporting arm; a first end of said first gas spring being pivotally connected to said first cross rod; a second end of said first gas spring being pivotally connected to said first pin-connected part; a second supporting arm having an end pivotally connected with said front part of said bracket, said second supporting arm including a second gas spring positioned in an inner portion of said second supporting arm and a second cross rod disposed at said inner portion of said second supporting arm; a first end of said second gas spring being pivotally connected to said second cross rod; and a second end of said second gas spring being pivotally connected to said second pin-connected part; a third supporting arm having an end pivotally connected with the other end of said second supporting arm; a joint pivotally connected with the other end of said third supporting arm; and a setting seat pivotally connected with the joint.

To provide a further understanding of the invention, the following detail description illustrates embodiments and examples of the invention, this detailed description being provided only for illustrating the invention.

BRIEF DESCRIPTION OF THE DRAWINGS

The drawings included herein provide a further understanding of the invention. A brief introduction of the drawings is as follows:

FIG. 6 is a bottom plan view of a preferred embodiment of the present invention.

FIG. 7 is a side view of the preferred embodiment of the present invention.

DETAILED DESCRIPTION OF THE EMBODIMENTS

Figure 1:
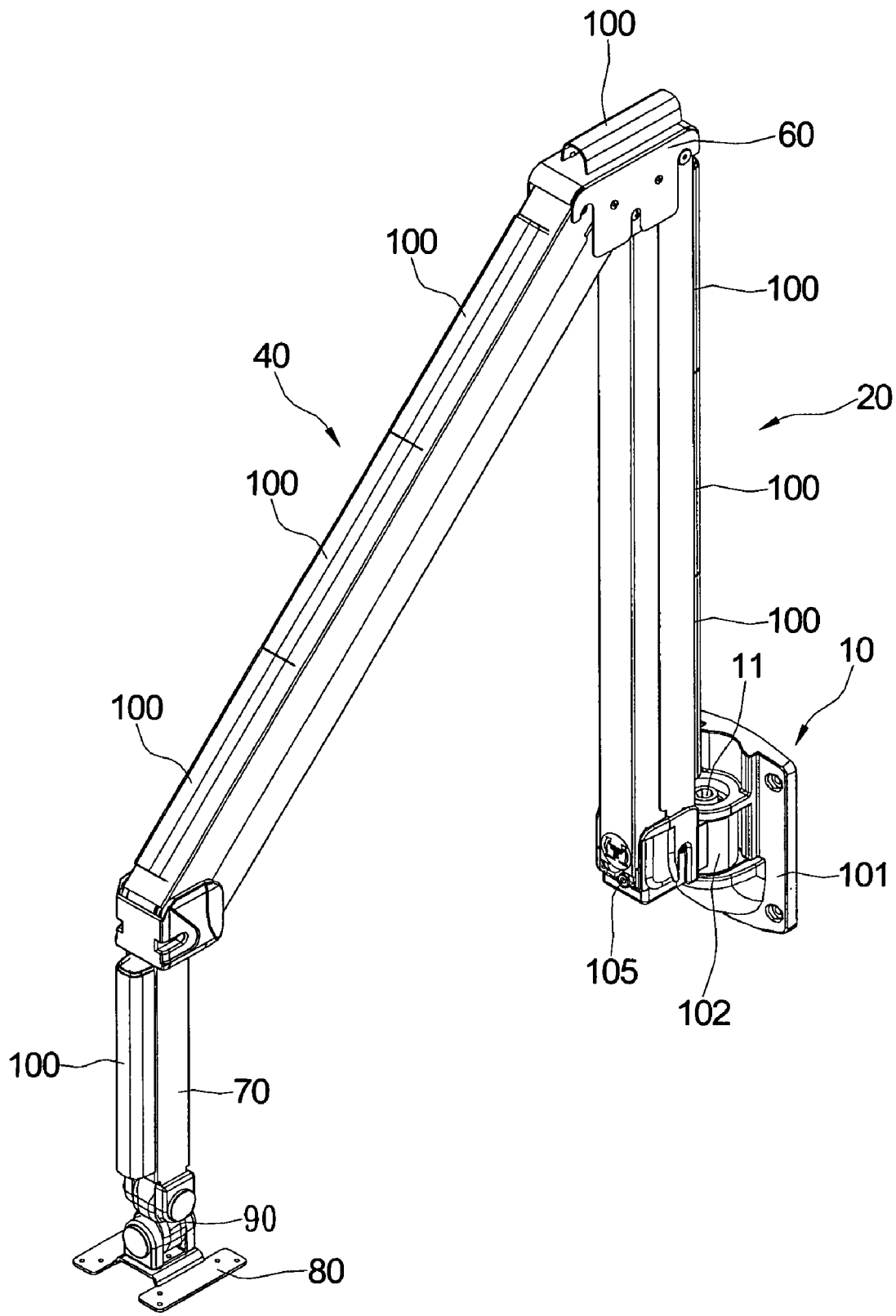
FIG. 1 is a perspective view of a preferred embodiment of the present invention.
Figure 2:
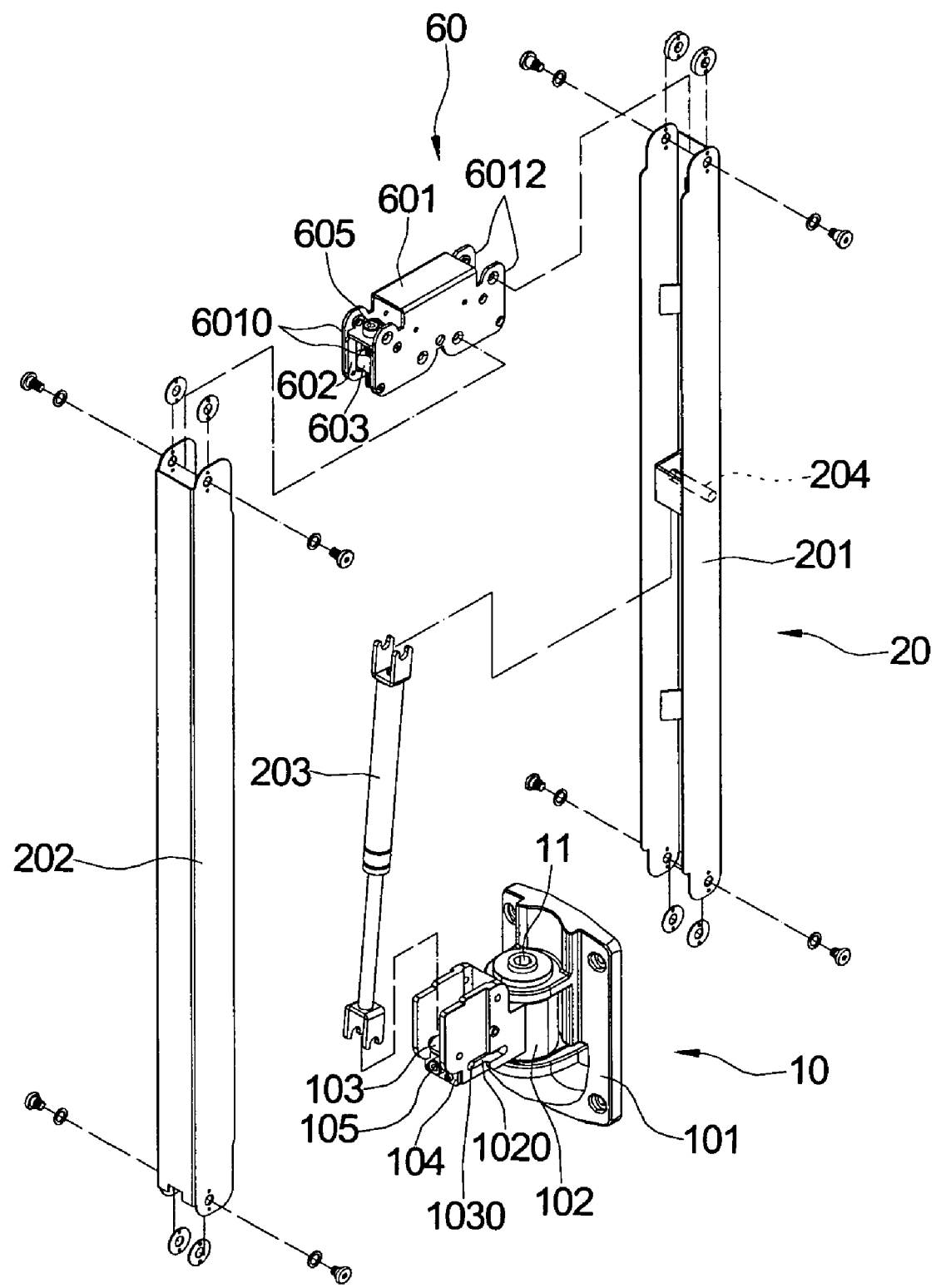
FIG. 2 is a partial exploded perspective view of a preferred embodiment of the present invention.
Figure 3:
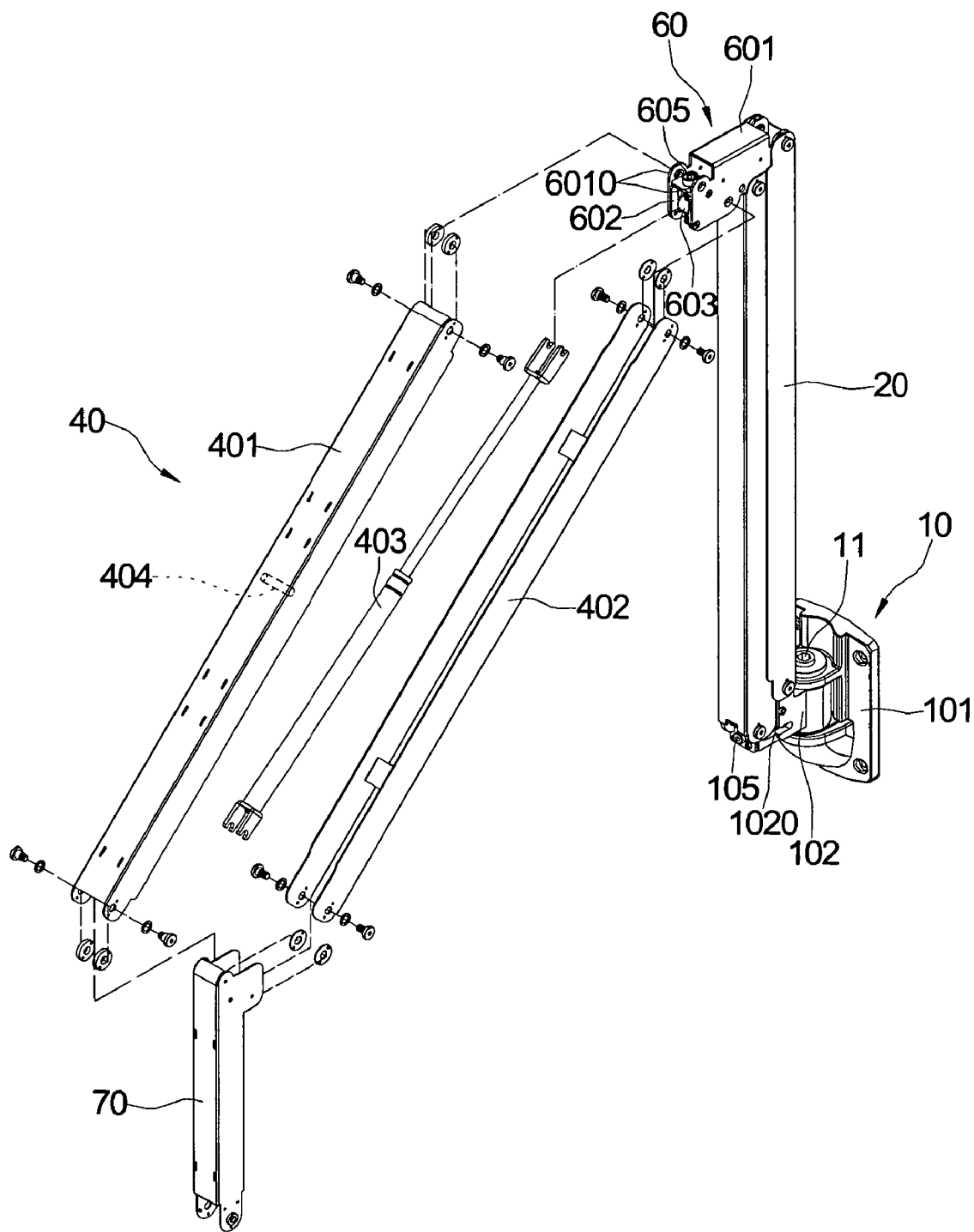
FIG. 3 is another partial exploded perspective view of a preferred embodiment of the present invention.
Figure 4:
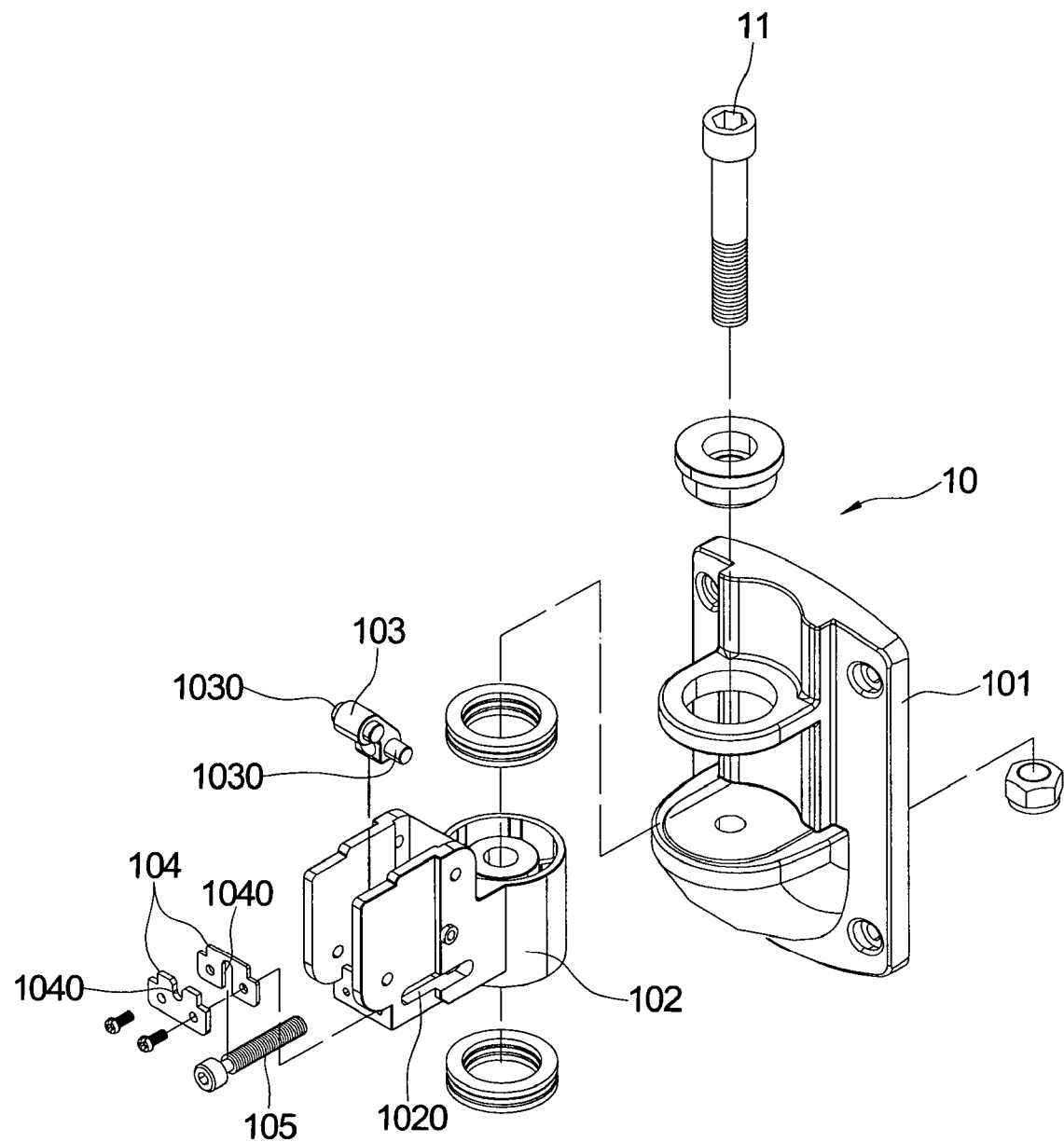
FIG. 4 is an exploded perspective view of a preferred embodiment of the bearing seat of the present invention.
Figure 5:
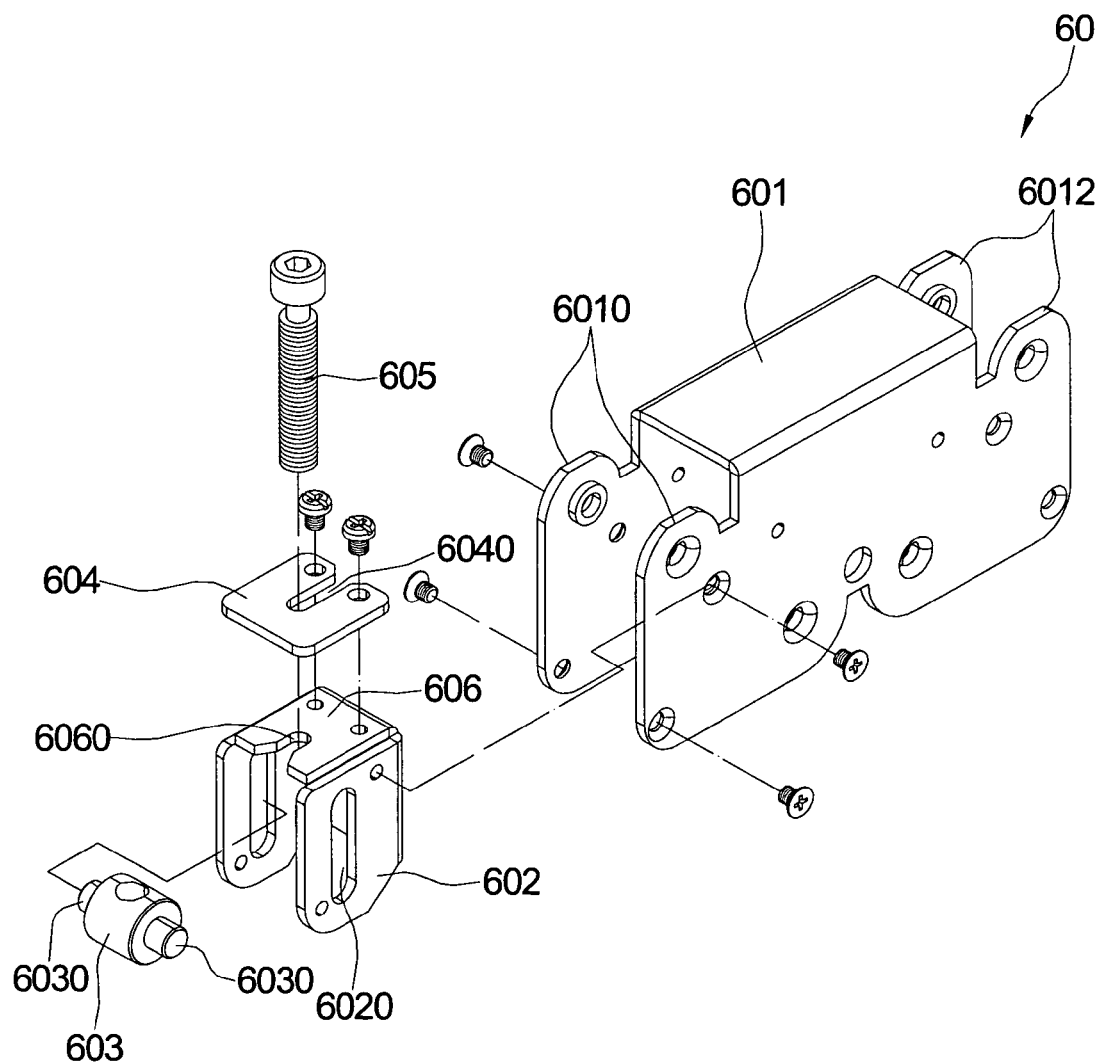
FIG. 5 is an exploded perspective view of a preferred embodiment of the pin-connected mechanism of the present invention.

Referring now to the drawings wherein the showings are for the purpose of illustrating the preferred embodiments of the present invention only, and not for the purpose of limiting the same.

Referring to FIGS. 1 to 6, the present invention provides a supporting shelf including a bearing seat 10, a first supporting arm 20, a second supporting arm 40, a pin-connected mechanism 60, a third supporting arm 70, a setting seat 80, a joint 90, and a plurality of casings 100.

The bearing seat 10 includes a fixing part 101, a first connecting part 102, a first pin-connected part 103, two first holding components 104 and a first fixing screw rod 105. The first connecting part 102 defines two first slideways 1020 at two opposing walls thereof. The first pin-connected part 103 has a first axle 1030 at opposing ends thereof. Each of the first holding components 104 has a breach 1040. The breaches 1040 correspond to each other so as to form a hole for the first fixing screw rod 105 to screw through.

Figure 12:
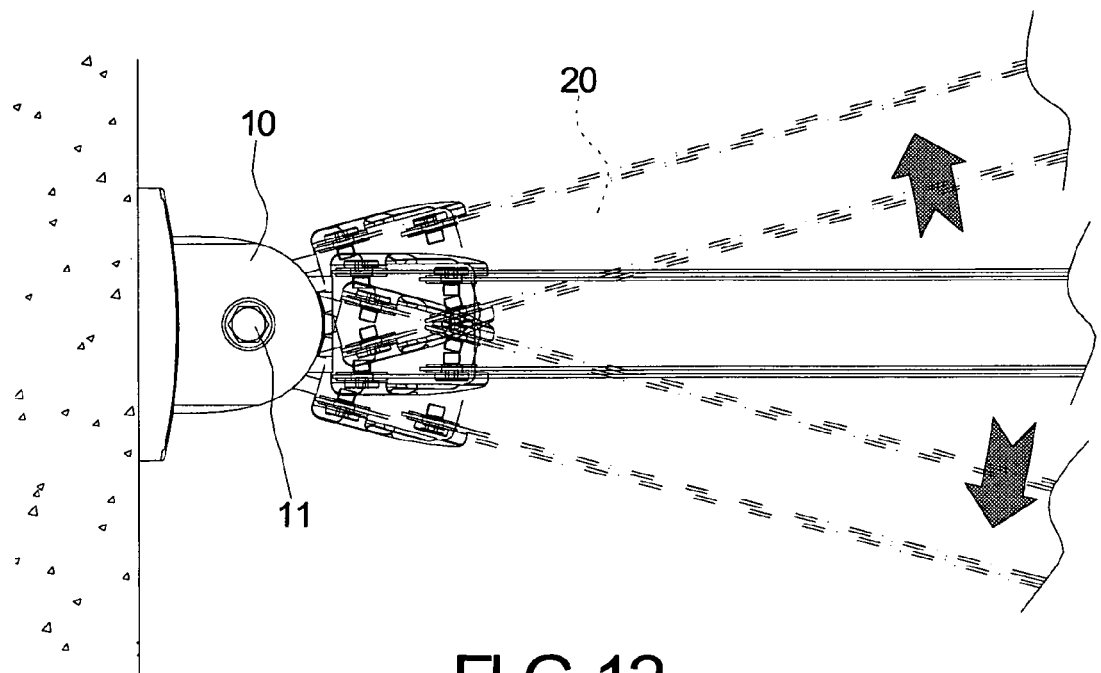
FIG. 12 is a second action view of the preferred embodiment of the present invention.

In assembly of the bearing seat 10, the first connecting part 102 is pivotally connected with the fixing part 101 through a pivot 111 for the first supporting arm 20 when swinging left or right as shown in FIG. 12. The first axles 1030 fit within the first slideways 1020. The first holding components 104 are fixed to the first connecting part 102. The first fixing screw rod 105 is screwed on the first connecting part 102 through the first holding components 104 and screwed through the first pin-connected part 103. The first pin-connected part 103 can move along the slideways 1020 when the first fixing screw rod 105 is screwed in or out.

The pin-connected mechanism 60 includes a bracket 601, a second connecting part 602, a second pin-connected part 603, a second holding component 604 and a second fixing screw rod 605. The bracket 601 has a front part 6010 and a rear part 6012. The second connecting part 602 defines two second slideways 6020 at two opposing walls thereof. The second connecting part 602 further includes a third holding component 606 at one end thereof The third holding component 606 has a breach 6060. The second pin-connected part 603 has a second axle 6030 at opposing ends thereof. The second holding component 604 has a breach 6040. The breaches 6040, 6060 corresponds to each other so as to form a hole for the second fixing screw rod 605 to screw through.

In assembly of the pin-connected mechanism 60, the second connecting part 602 is connected with the front part 6010. The second axles 6030 fit within the corresponding second slideways 6020. The second fixing screw rod 605 is screwed on the second connecting part 602 through the second holding component 604 and screwed through the second pin-connected part 603. The second pin-connected part 603 can move along the slideways 6020 when the second fixing screw rod 605 is screwed in or out.

The first supporting arm 20 includes an upper link 201, a lower link 202, a first gas spring 203, and a first cross rod 204. The first gas spring 203 is positioned in an inner portion of the first supporting arm 20. The first cross rod 204 is disposed at the inner portion of the upper link 201 of the first supporting arm 20. A front end of the first gas spring 203 is pivotally connected to the first cross rod 204. A rear end of the first gas spring 203 is pivotally connected to the first pin-connected part 103. The upper link 201 of the first supporting arm 20 has one end pivotally connected with the first connecting part 102 and the other end pivotally connected with the rear part 6012 of the bracket 601. The lower link 202 of the first supporting arm 20 has one end pivotally connected with the first connecting part 102 and the other end pivotally connected with the rear part 6012 of the bracket 601.

Figure 8:
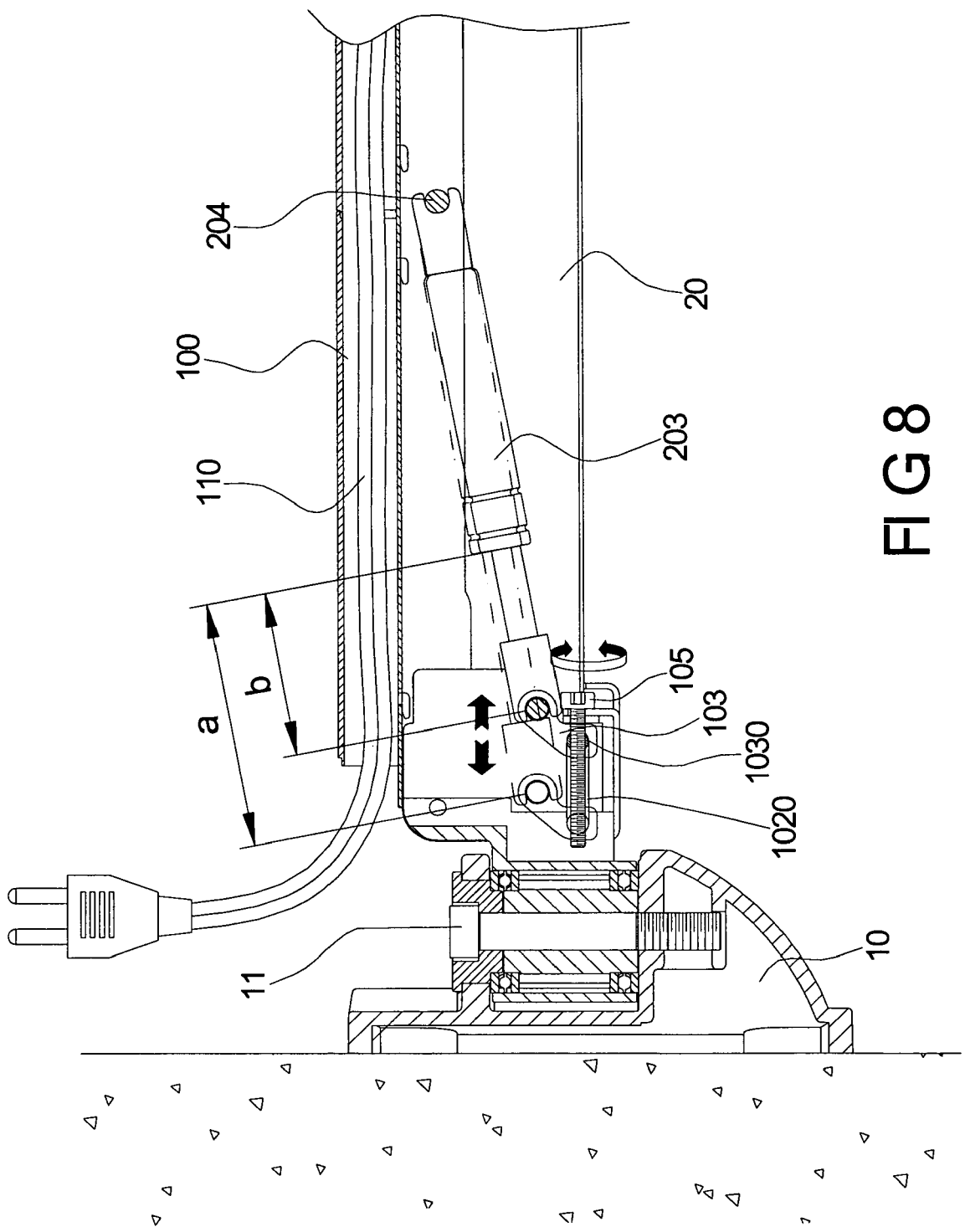
FIG. 8 is an enlarged view of an A-part according to FIG. 7.

In operation, referring to FIG. 7 and FIG. 8, the first fixing screw rod 105 screws into the first pin-connected part 103, so that the first fixing screw rod 105 adjusts the front or rearward position of the first pin-connected part 103. This allows the first pin-connected part 103 to slide forward or backward in the first slideways 1020. Therefore, the moment arm of the first supporting arm 20 is changeable. As such, the amount of weight the first supporting arm 20 can bear is variable.

The second supporting arm 40 includes an upper link 401, a lower link 402, a second gas spring 403 and a second cross rod 404. The second gas spring 403 is positioned in an inner portion of the second supporting arm 40. The second cross rod 404 is disposed at the inner portion of the upper link 401 of the second supporting arm 40. A front end of the second gas spring 403 is pivotally connected to the second cross rod 404. A second end of the second gas spring 403 is pivotally connected to the second pin-connected part 603. The upper link 401 of the second supporting arm 40 has one end pivotally connected with a rear end of the third supporting arm 70 and the other end pivotally connected with the front part 6010 of the bracket 601. The lower link 402 of the second supporting arm 40 has one end pivotally connected with the rear end of the third supporting arm 70 and the other end pivotally connected with the front part 6010 of the bracket 601.

Figure 9:
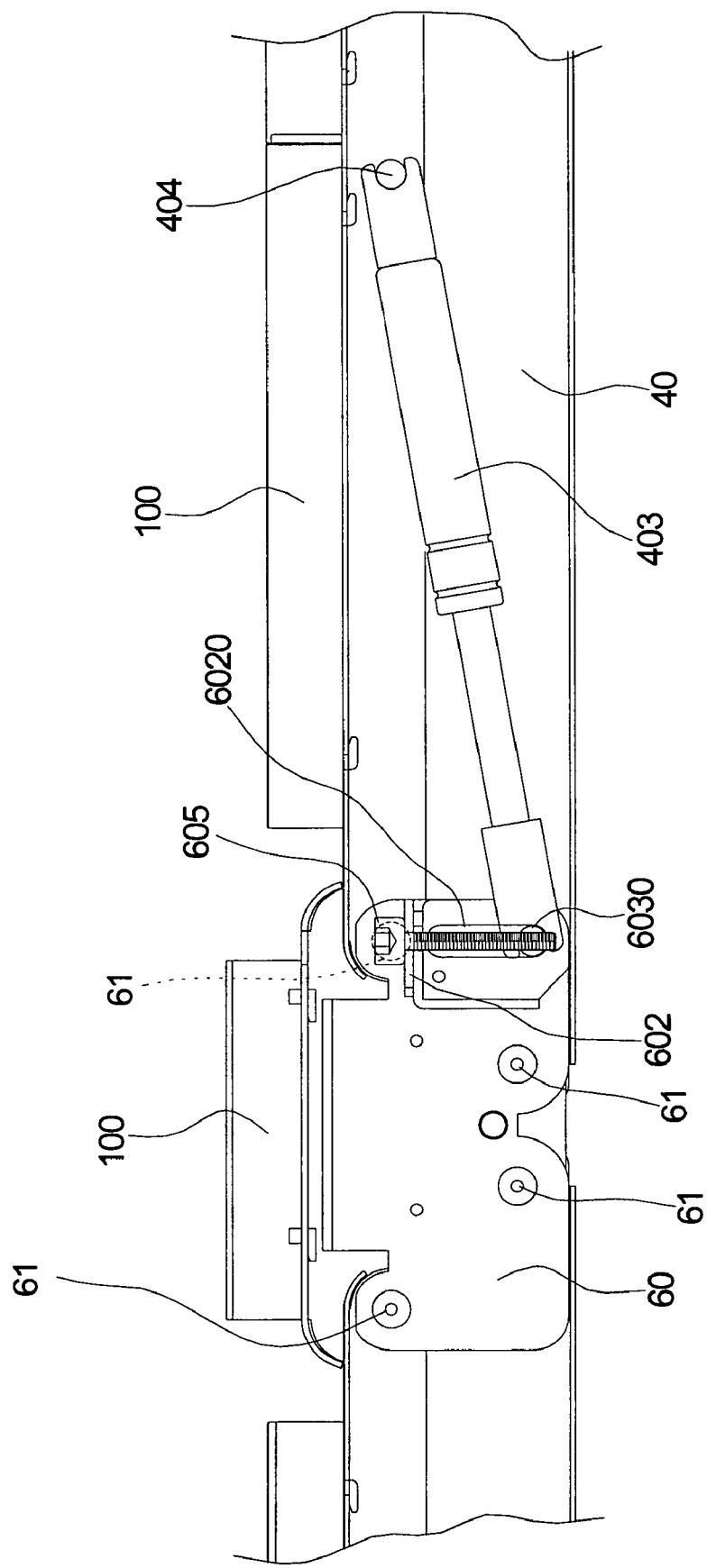
FIG. 9 is an enlarged view of a B-part according to FIG. 7.
Figure 13:
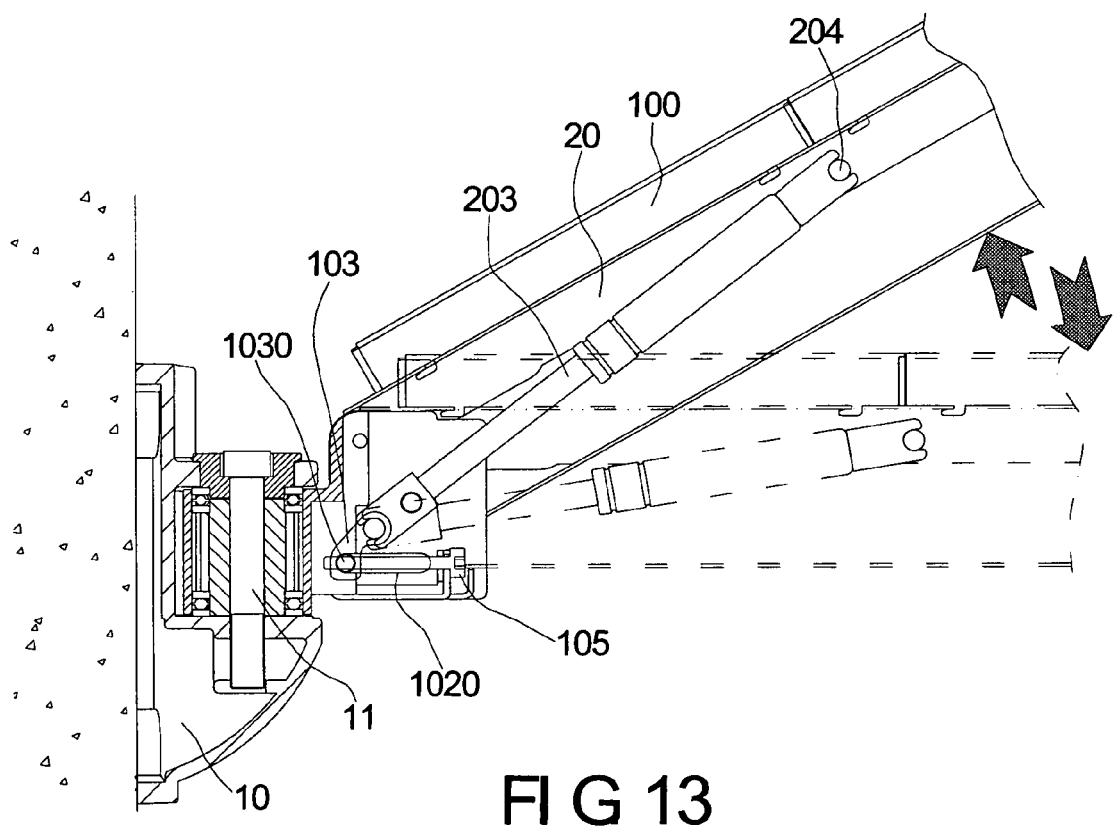
FIG. 13 is a third action view of the preferred embodiment of the present invention.
Figure 14:
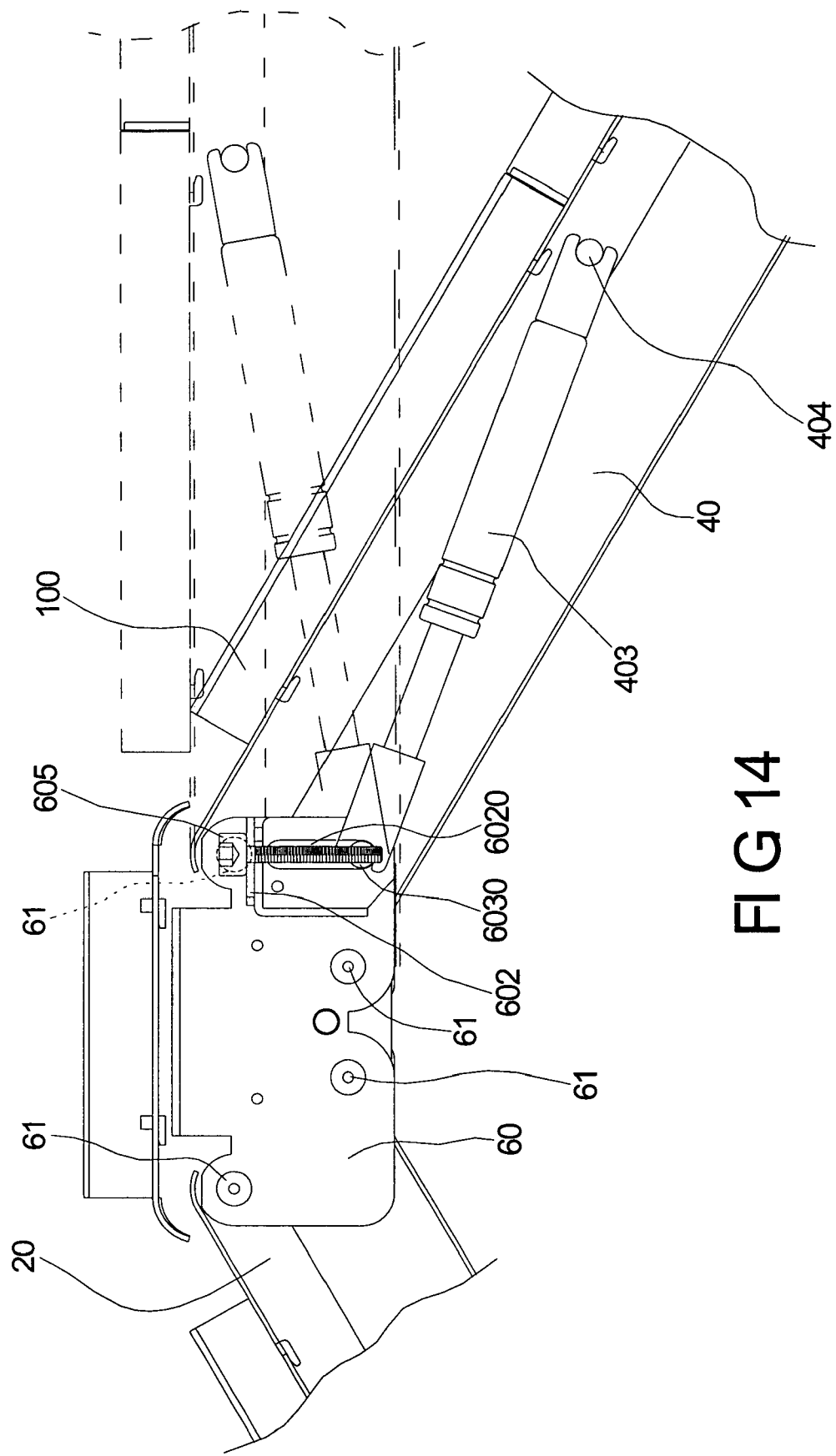
FIG. 14 is a fourth action view of the preferred embodiment of the present invention.

In operation, referring to FIG. 7 and FIG. 9, the rear end of the second supporting arm 40 is pivotally connected with the front end of the first supporting arm 20 through the pin-connected mechanism 60. Both the front end and the rear end of the pin-connected mechanism 60 have a pivot 61 respectively. The second supporting arm 40 and the first supporting arm 20 can extend forwards or backwards through the pivots 61 as shown in FIG. 13. and FIG. 14. Furthermore, the second fixing screw rod 605 screws with the second pin-connected part 603, so that the second fixing screw rod 605 can adjust the up or down position of the second pin-connected part 603. Then the second pin-connected part 603 can slide up or down in the second slideways 6020. Thereby, the moment arm of the second supporting arm 40 is changed. The second supporting arm 40 adjusts the bearing of the supporting shelf.

Figure 10:
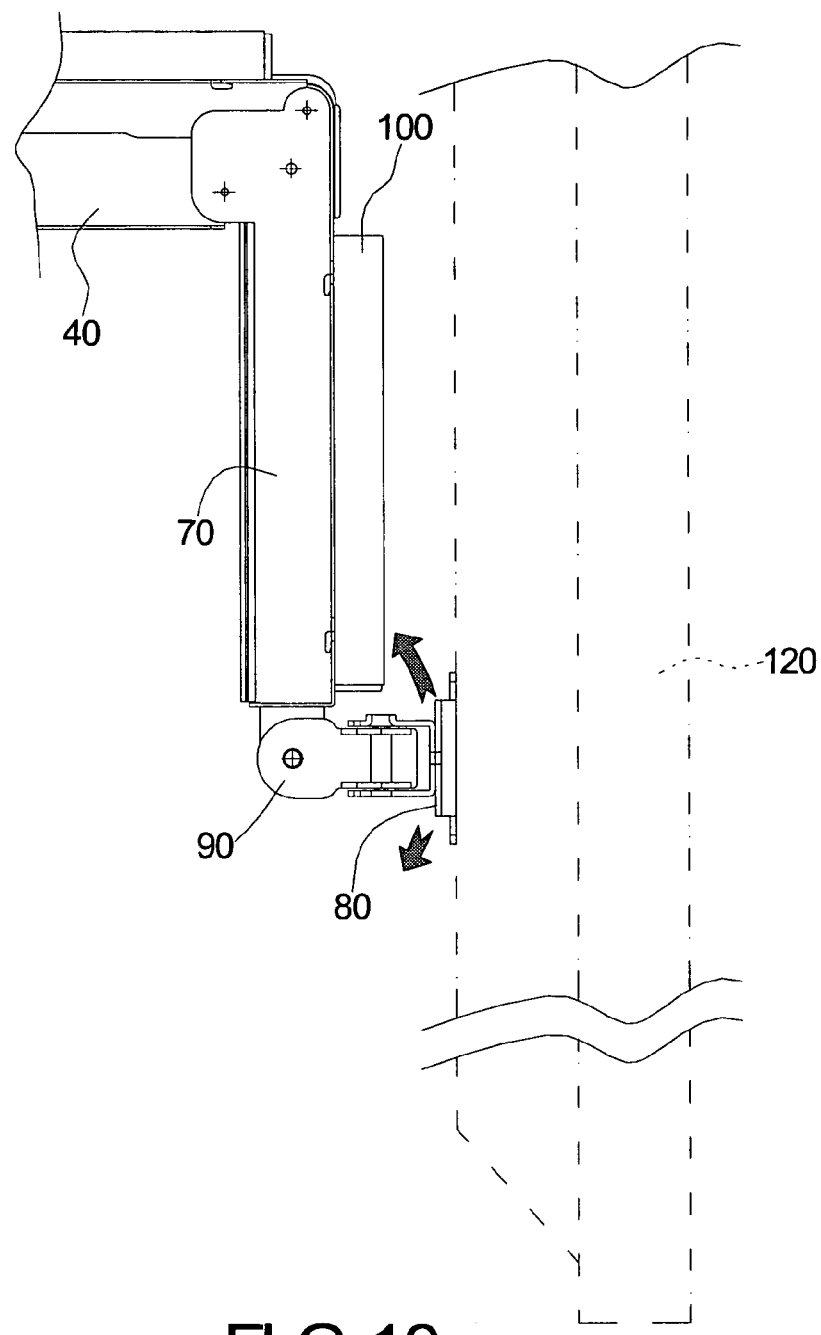
FIG. 10 is an enlarged view of a C-part according to FIG. 7.
Figure 11:
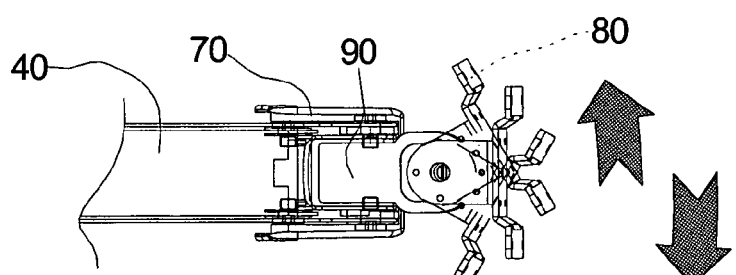
FIG. 11 is a first action view of the preferred embodiment of the present invention.

Referring to FIG. 7, FIG. 10 and FIG. 11, a front end of the setting seat 80 is attached to a LCD 120. The rear end of the setting seat 80 is pivotally connected with the front end of the joint 90. The joint 90 is pivotally connected with the front end of the third supporting arm 70. The setting seat 80 allows the LCD 120 move up, down, left or right through the joint 90.

Each of the casings 100 is a rectangular hollow casing. The casings 100 are disposed adjacent to a side edge of the supporting arms for receiving a wire 110 disposed on the supporting shelf as shown in FIG. 8. The casings 100 are for avoiding the wire 110 being exposed purely for aesthetic purposes.

So, the present invention has the following characteristics:

1. The second supporting arm 40 has a rear end that is pivotally connected with a front end of the first supporting arm 20 through the pin-connected mechanism 60 for the second supporting arm 40 and the first supporting arm 20 when they are extended forwards or backwards action. So the pivoted-connection between the second supporting arm 40 and the first supporting arm 20 is not only extending the length of the supporting shelf, but also increasing its agility in space to meet the different need of the user.

2. The first gas spring 203 and the second gas spring 403 adjust themselves, and their moment arms, through the first fixing screw rod 105 and the second fixing screw rod 605 respectively. Both the first and second fixing screw rods 105 and 605 adjust the bearing of the supporting shelf.

3. The setting seat 80 is pivotally connected with the joint 90 making the LCD 120 moving up, down, left or right through the joint 90 for extending the action area of the LCD 120 and increasing its agility.

There has thus been described a new, novel and heretofore unobvious supporting shelf eliminating the aforesaid problem in the prior art. Furthermore, those skilled in the art will readily appreciate that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A supporting shelf, comprising:

a bearing seat having a fixing part, a first connecting part pivotally connected with said fixing part and defining two first slideways at two opposing walls thereof, a first pin-connected part having an first axle at opposing ends thereof, each of said first axles fitting within said first slideways; and a first fixing screw rod screwed on said first connecting part and screwed through said first pin-connected part;

a pin-connected mechanism, including a bracket having a front part and a rear part, a second connecting part connected with said front part and defining two second slideways at two opposing walls thereof, a second pin-connected part having an second axle at opposing ends thereof, each of said second axles fitting within said second slideways and a second fixing screw rod screwed on said second connecting part and screwed through said second pin-connected part;

a first supporting arm having an end pivotally connected with said first connecting part and the other end pivotally connected with said rear part of said bracket, said first supporting arm including a first gas spring positioned in an inner portion of said first supporting arm and a first cross rod disposed at said inner portion of said first supporting arm;

a first end of said first gas spring being pivotally connected to said first cross rod;

a second end of said first gas spring being pivotally connected to said first pin-connected part;

a second supporting arm having an end pivotally connected with said front part of said bracket, said second supporting arm including a second gas spring positioned in an inner portion of said second supporting arm and a second cross rod disposed at said inner portion of said second supporting arm;

a first end of said second gas spring being pivotally connected to said second cross rod;

a second end of said second gas spring being pivotally connected to said second pin-connected part;

a third supporting arm having an end pivotally connected with the other end of said second supporting arm;

a joint pivotally connected with the other end of said third supporting arm; and a setting seat pivotally connected with the joint.

2. The supporting shelf of claim 1, further comprising a plurality of casings disposed on a side edge of the supporting shelf for receiving wires.

3. The supporting shelf of claim 1, wherein the first connecting part of the bearing seat pivotally connects vertically with the fixing part through a pivot for the supporting shelf when it is swung left or right.

4. The supporting shelf of claim 1, wherein the bearing seat further includes two first holding components fixed on said first connecting part, each of said holding components has a breach, said breaches corresponds to each other so as to form a hole for said first fixing screw rod to screw through.

5. The supporting shelf of claim 1, wherein the pin-connected mechanism further includes a second holding component having a breach, said second connecting part includes a third holding component having a breach, said breaches corresponds to each other so as to form a hole for said second fixing screw rod to screw through.

6. The supporting shelf of claim 1, wherein the setting seat attaches to a LCD monitor and allows the LCD monitor to move up, down, left or right through the joint.

* * * * *